Dec. 25, 1951     L. BATCHELDER     2,580,151

DISTANCE MEASURING SYSTEM

Filed July 26, 1947

INVENTOR.
LAURENCE BATCHELDER
BY
HIS ATTORNEY

Patented Dec. 25, 1951

2,580,151

UNITED STATES PATENT OFFICE 2,580,151

DISTANCE MEASURING SYSTEM

Laurence Batchelder, Cambridge, Mass., assignor to Raytheon Manufacturing Company, a corporation of Delaware Application July 26, 1947, Serial No. 763,999

10 Claims. (Cl. 235—61.5)

The present invention relates to an electric range computing circuit which may be applied for range and direction determination in the field of submarine signaling by compressional waves, and the field of signaling in air by compressional or electromagnetic waves.

The present system operates on the principle that, knowing two angles of the triangle and the included side, all angles and sides of the triangle may be determined. In the present invention the known side is a fixed base and the angles which are determined are those which have this side as one of the sides of the angles. The particular object of the present invention is to provide a system whereby, in a simple electrical circuit, the range identified as one unknown side of the triangle is automatically computed.

Figure 2:
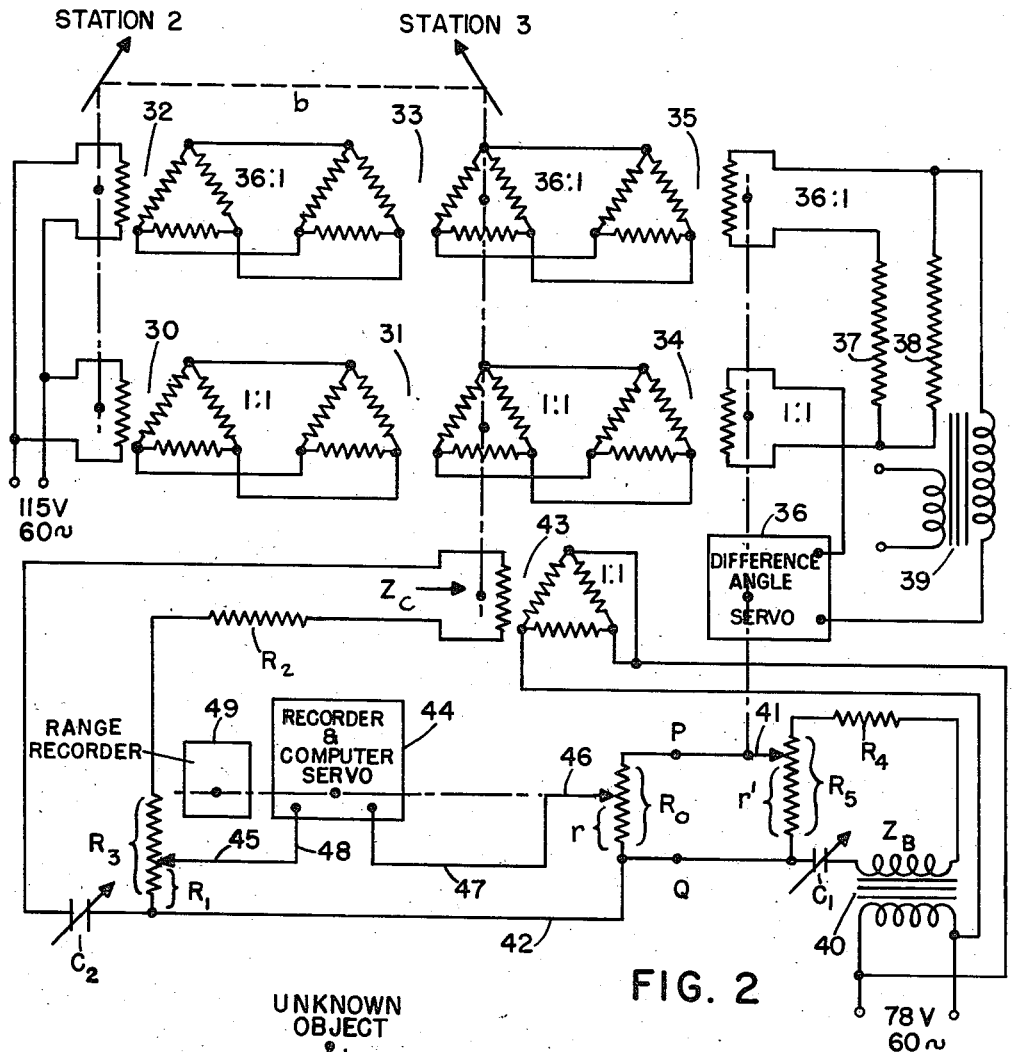
Figure 1:
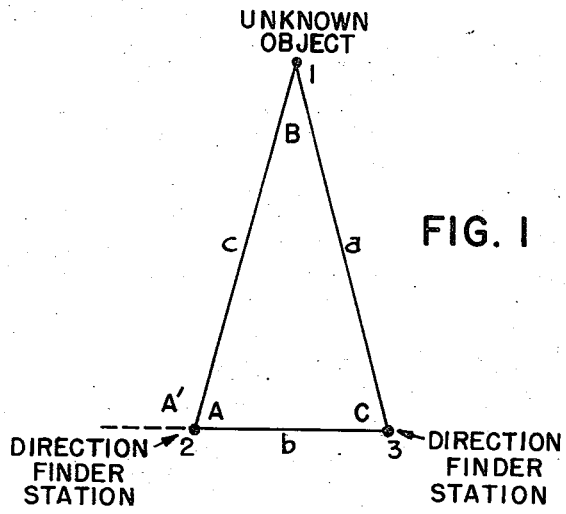

The present invention will be more clearly understood from a consideration of the specification set forth below when taken in connection with the drawing illustrating an embodiment of the invention in which Fig. 1 illustrates the triangulation principle on which the invention is based and Fig. 2 shows schematically the circuit and system of the present invention. In Fig. 1 it is assumed that point 1 is the object being observed. This object may be giving off either electromagnetic waves in air or sound waves in the air or in a water medium. For instance the object may be an enemy submarine being observed through its noise or signals or through the radiation of electromagnetic waves or sound waves from signals given by the object or by reflected energy. Stations 2 and 3 are observation stations which may be on shore, on a vessel or in any other desired position with a known intervening base equal to the line $b$. The distances of the point 1 from the points 2 and 3 are established by the lines $c$ and $a$ respectively and the angles A, B and C are the angles of the triangle with the angle A' the supplement of A.

Referring now to Fig. 2, stations 2 and 3 are provided with directive receiving means which may be of the compressional wave or electromagnetic wave type or simply sighting stations such as telescopes, depending upon the kind of energy which station 1 is emitting. The directive receivers at stations 2 and 3 respectively represented by the arrows are turned by turning the rotors 30 and 31 of the synchro-generators. These rotors 30 and 31 may operate on the same shaft with the directive receivers and are interlocked with similar rotors 32 and 33 respectively which are geared up to the speed of 36:1 or even greater. If a greater accuracy is desired the gearing should be correspondingly higher and gear ratios as high as 100:1 or more may generally be used. Rotors of the differential generators 30 and 31 are connected together and so also those of 32 and 33 to provide the control transformers 34 and 35 with the proper phase potential corresponding to the difference angle between the angles A' and C of Fig. 1 which, it is noted, is equal to the angle B. 34 is a control transformer having a 1:1 ratio and 35 a control transformer having the same ratio as the synchro-generators 32 and 33.

A difference angle servo system is indicated at 36. This is operated through the control transformers 34 and 35 to turn a linear potentiometer $R_5$ through an angle or distance proportional to the value of the angle $B=A'-C$. The error signal for this system is derived from these two control transformers, one of which, 34, is geared to turn through the angle B (Fig. 1) and the other, 35, through the stepped up ratio that is desired which here, as an example, is shown as 36:1. A voltage divider comprising the resistances 37 and 38 is connected across the stepped up control transformer 35 so that about 11% of its normal output E. M. F. is in series with the output E. M. F. of the control transformer rotor 34. A fixed voltage of appropriate magnitude is connected in series with the control transformers as shown in Fig. 2 at 39.

The computer circuit itself includes a transformer 40 whose impedance is designated as $Z_B$ referred to the secondary side. Connected across this impedance in series are resistances $R_4$ and $R_5$ and an adjustable condenser $C_1$. $R_5$ may be a potentiometer having a linear characteristic with an adjustable slide wire connection 41 which is connected to the common line 42 through a resistance $R_0$. The differential angle servo 36 serves to control the position of the potentiometer arm 41 either by rotary or linear motion and thereby establishes the component $r'$ which corresponds to the angle B.

A control transformer rotor 43 is also driven synchronously with the directive receiver at station 3. This control transformer is provided with a 1:1 ratio and is identical in characteristics as far as the transformer is concerned with the transformer 40. This is necessitated by the fact that the E. M. F. in the right hand loop just described must be equal in magnitude and phase to that in the left hand loop.

If the two transformers have an unequal primary to secondary phase shift this must be corrected in the primary circuit of either one so that the voltage across $R_5$ is in phase with that across $R_3$. The transformer 43 has an impedance of $Z_C$ referred to the rotor. The output of the control transformer 43 is in a series circuit comprising the resistances $R_2$, $R_3$ and the condenser $C_2$ which serves the same purpose as the condenser $C_1$, namely to annul or tune the inductance in the series circuit. One side of this series circuit is the common line 42 which connects to an extremity of $R_5$, $R_0$ and $R_3$. The recorder and computer servo 44 has one of its terminals adjustably connected by the potentiometer arm 45 to a point along the resistance $R_3$ establishing from the common connection a resistance $R_1$ which corresponds to the fixed base distance $b$ (Fig. 1), the voltage drop in this resistance corresponding during the positioning of the observing arrow at 3 to $b \sin C$. The other connection from the recorder and computer servo 44 is to the adjustable arm 46 which is moved by the recorder and computer servo along the resistance $R_0$ until the error voltage $E_e$ appearing between the lines 47 and 48 from the recorder and computer servo decreases to a zero voltage. When this balance has been reached then the voltage drop across that portion of the resistance $R_0$ designated by $r$ is a measure of the distance $c$ and therefore the resistance $R_0$ may be calibrated in distances corresponding to $c$. The potentiometer arm 45 is set according to the magnitude of the base line $b$ and if this base line is changed it follows that the position of the arm 45 must be changed.

The arm 41 is set by the servo 36 corresponding to the angle $B$ as stated and the arm 46 set to provide a zero error voltage actually provides in that portion of the resistor $R_0$ designated as $r$ the balance potential $c \sin B$ or its close approximation $cB$ as will be shown.

A separate range recorder may be driven synchronously or on the same shaft with the recorder and computer servo 44. This is shown at 49. For the mathematical analysis of the system reference is made to the following discussion.

It follows from Fig. 1 that $$\frac{a}{\sin A} = \frac{b}{\sin B} = \frac{c}{\sin C} \quad (1)$$

and that the distance $$c = b \frac{\sin C}{\sin B}$$

$$\frac{\sin B}{B}$$

is a constant equal approximately to unity where $B$ is not greater than 15° which is the case here. Therefore, $$c = b \frac{\sin C}{B} \quad (2)$$

The angle $B$ is usually very small since the object being observed is, in practically every instance, at a distance which is very great compared to the base. For instance if the base line is 200′ and the object at station 1 is a mile away or 5000′, the angle at B will be approximately 2°.

It may be assumed that the input impedance of the computer and recorder servo-system is so high as to constitute an open-circuit between the detector leads, as compared with the resistances in the computer circuit. Under this condition, the error signal between the lines 47 and 48 is given by the expression $$E_e = E_b \left\{ \left[ \frac{r' R_0}{r' + R_0} \right] \div \left[ \frac{r' R_0}{r' + R_0} + (R_5 - r') + R_4 + Z_B \right] \right\} \frac{r}{R_0} - E_c \frac{R_1}{R_2 + R_3 + Z_C} \sin C \quad (3)$$

where
$E_b$ = complex induced E. M. F. in the transformer 40.
$E_c$ = maximum complex induced E. M. F. in the rotor of the control transformer 43.
$Z_B = R_B + jX_B$ = equivalent leakage impedance of transformer 40 referred to secondary side.
$Z_C = R_C + jX_C$ = equivalent leakage impedance of station No. 3 control transformer 43 referred to the rotor.

(It is assumed that the leakage reactances are negligibly small in comparison with the resistances involved. Hence $Z_B$ and $Z_C$ are hereafter written $Z_B$ and $Z_C$). For abbreviation let $R_{PQ}$ = equivalent resistance to the right of points P and Q. Make the following assumptions:

(1) $\quad (R_{PQ})_{\max} = \frac{R_5(R_4 + Z_B)}{R_4 + R_5 + Z_B} << R_0$ (2) the ratio $$\frac{X_B}{R_B + R_4 + R_5}$$

is so small as to cause negligible phase shift between the E. M. F. $E_B$ and the current in the secondary circuit of that transformer, and the same for the left-hand loop. If necessary, series capacitances ($C_1$ and $C_2$) may be added to the right and left loops (Figure 2) to give resonance at 60 cycles.

On the basis of the foregoing assumptions, the error-signal equation becomes $$E_e = E_B \left[ \frac{r'}{R_4 + R_5 + R_B} \right] \frac{r}{R_0} - E_C \frac{R_1 \sin C}{R_2 + R_3 + Z_C} \quad (4)$$

($Z_C$ and $R_C$, $Z_B$ and $R_B$ are hereafter used interchangeably.) Since the E. M. F.'s $E_e$, $E_B$, and $E_C$ are in time phase according to the assumptions above, the vector notation may be discarded, and the letters $E_e$, $E_B$, and $E_C$ regarded as representing the rms values of the respective E. M. F.'s. When the error-signal is zero, then $$E_B \left[ \frac{r'}{R_4 + R_5 + R_B} \right] \frac{r}{R_0} =$$

$$E_C \frac{R_1 \sin C}{R_2 + R_3 + Z_C} \sin C \frac{\sin C}{r'} =$$

$$\frac{E_B}{E_C} \times \frac{(R_2 + R_3 + Z_C)}{(R_4 + R_5 + R_B)} \times \frac{r}{R_0 R_1} \quad (5)$$

Since the potentiometer $R_5$ is linear over its working range, $$r' = kB \quad (6)$$

Hence $$\frac{\sin C}{kB} = \frac{E_B(R_2 + R_3 + Z_C)r}{E_C(R_4 + R_5 + R_B)R_0 R_1} \quad (7)$$

$$\frac{\sin C}{B} = \frac{kE_B(R_2 + R_3 + Z_C)r}{E_C(R_4 + R_5 + R_B)R_0 R_1} \quad (8)$$

From Equation 2, $B = \sin B$, and thus $$\frac{\sin C}{\sin B} = \frac{kE_B(R_2 + R_3 + Z_C)r}{E_C(R_4 + R_5 + R_B)R_0 R_1}$$

Finally, $$\text{Range} = b \frac{\sin C}{\sin B} = \frac{bkE_B(R_2 + R_3 + Z_C)r}{E_C(R_4 + R_5 + R_B)R_0 R_1} \quad (9)$$

Make the following substitutions:

(1) $\frac{E_B}{E_C} = e$ (2) $\frac{k(R_2 + R_3 + Z_C)}{(R_4 + R_5 + R_B)R_0} = p$ The range equation now becomes $$c = bep\frac{r}{R_1} \quad (10)$$

Since $R_1$ is fixed, the range is proportional to the resistance $r$, and for a linear potentiometer, $r$ is proportional to the travel of the contact arm. If the servo-system drives a recording device of some sort whose travel is always proportional to that of the potentiometer $R_0$ (Fig. 2), then the whole system becomes an automatic range-computing and indicating device, so long as the assumptions of the preceding pages are not violated.

It can be seen from Equation 10 that the whole system can be indexed (assuming proper mechanical adjustments have been made) by varying $R_1$ to the proper value.

For triangles where either of the base angles becomes small, the angle B will also become small, and hence the electrical signals which are proportional to sin C and B in the computer circuit approach zero. Although the ratio $$\frac{\sin C}{B}$$

will approach a finite limit determined by the distance $c$, the electrical counterpart of this ratio, derived from the control transformer 43 and the difference-angle potentiometer $R_5$, may reach any limit, independent of the distance $c$, because of potentiometer nonlinearity and/or control transformer output error near zero. Errors of several hundred percent in the range indication would be quite possible in such cases. Thus the use of the system is limited to triangles in which the base angles remain large (greater than 10°).

The largest single source of error in the range indication is the servo-system used for driving $R_5$ through an angle proportional to the angle B. Since B is normally small (in cases where this system can be used), even a small numerical error, in setting any device to the angle B, will cause a large percent error in the setting. For example, if a pointer arm is to be turned through an angle of 1°, and it is actually turned through 0.5°, the numerical error is 1°−0.5°; the present error is $$\frac{0.5°}{0.5°} \times 100\% = 100\%$$

But if the pointer is to be turned through 36°, and a numerical error of 0.5° is committed, the percent is only $$100\% \times \frac{0.5°}{35.5°} = 1.41\%$$

If the total desired angle is made 100°, the percent error can be reduced to $$100\% \times \frac{0.5°}{100°} = 0.50\%$$

Thus it can be seen that the difference-angle servo-system must have not only a 1:1 error-signal source, but a geared-up source as well. In this discussion 36:1 has been used, but for the purpose of accuracy in obtaining an angle proportional to B, 100:1 would be better.

It will be noted from Fig. 2 that the recorder and computer servo 44 drives the arm 46 until the voltage across the lines 47 and 48 becomes zero. The balance on the one side is a quantity which is in proportion to $b$ times the sine of C, and on the other side is proportional to $c \times B$ which meets the condition of Equation 2. This balance may be determined in ways other than by the driving arm of a recorder and computer servo, but for automatic indication the method described in connection with Fig. 2 is preferred. If the balance is obtained manually, the arm 46 may be moved to the desired position which will be obtained when an indicator connected across the lines 47 and 48 indicates zero.

Having now described my invention, I claim:

1. In an electrical range computing circuit operative by angular directional observations from points on a known linear base of a distant object whose range to one of said points is to be determined, means for establishing an electrical potential corresponding to the angle subtended by two lines extending respectively between the target and each of the observation points and means for establishing an electrical potential corresponding to a function of one of the base angles, a circuit on which the latter potential is impressed for providing a potential corresponding to the product of the base and the sine of said base angle, and means connected between said first-mentioned means and said circuit for selecting a portion of the first mentioned potential equal to the potential corresponding to the product whereby said range is determined.

2. In an electrical range computing circuit operative by angular directional observations from points on a known linear base of a distant object whose range to one of said points is to be determined, means for establishing an electrical potential corresponding to the angle subtended by two lines extending respectively between the target and each of the observation points and means for establishing an electrical potential corresponding to the sine of one of the base angles, a circuit on which the latter potential is impressed for providing a potential corresponding to the product of the base and the sine of said base angle, and means connected between said first-mentioned means and said circuit for selecting a portion of the first mentioned potential equal to the potential corresponding to said product, whereby said range is determined.

3. In an electrical range computing circuit operative by angular directional observations from points on a known linear base of a distant object whose range to one of said points is to be determined, means for establishing an electrical potential corresponding to the angle subtended by two lines extending respectively between the target and each of the observation points and means for establishing an electrical potential corresponding to the sine of one of the base angles, a circuit on which the latter potential is impressed for providing a potential corresponding to the product of the base and the sine of said base angle, and a servomotor connected between said first-mentioned means and said circuit to select a portion of the first mentioned potential equal to the potential corresponding to said product whereby said range is determined.

4. In an electrical range computing circuit operative by angular directional observations from points on a known linear base of a distant object whose range to one of said points is to be determined, a potentiometer having an adjustable tap, means for positioning said tap on said potentiometer establishing a potential corresponding to the angle subtended by two lines extending respectively between the target and each of the observation points, means for establishing an electrical potential corresponding to a function of one of the base angles, a second potentiometer on which the latter potential is impressed, said potentiometer having an adjustable tap for establishing a potential corresponding to the product of the base and the sine of said base angle, and means connected between the second mentioned adjustable tap and the first mentioned adjustable tap and adapted to move said first tap for selecting a portion of the first mentioned potential equal to the potential corresponding to the product, whereby said range is determined.

5. In an electrical range computing circuit operative by angular directional observations from points on a known linear base of a distant object whose range to one of said points is to be determined, circuit means including a potentiometer having a movable arm for establishing with said arm an electrical potential corresponding to the angle subtended by two lines extending respectively between the target and each of the observation points, means for establishing an electrical potential corresponding to a function of one of the base angles, a circuit including another potentiometer having a movable arm on which the latter potential is impressed for establishing with the latter arm a potential corresponding to the product of the base and the sine of said base angle, a connection between an end of each of said potentiometers, a third potentiometer connected between the first mentioned arm and said connection, and having a third movable arm, and a servomotor connected between the second mentioned arm and said third arm, and operatively connected to move said third arm until the energizing voltage thereacross is reduced to zero, whereupon said motor stops.

6. In an electrical range computing circuit operative by angular directional observations from points on a known linear base of a distant object whose range to one of said points is to be determined, circuit means for establishing an electrical potential corresponding to the angle subtended by two lines extending respectively between the target and each of the observation points, circuit means for establishing another electric potential corresponding to the product of the base and the sine of one of the base angles, a source of electrical power for both of said circuit means, means for adjusting both of said circuit means to equalize the phases of the energizing voltages therein, and means connected between said circuits for selecting a portion of the first mentioned potential equal to the potential corresponding to the product whereby said range is determined.

7. In an electrical range computing circuit operative by angular directional observations from points on a known linear base of a distant object whose range to one of said points is to be determined, circuit means for establishing an electrical potential corresponding to the angle subtended by two lines extending respectively between the target and each of the observation points, circuit means for establishing another electric potential corresponding to the product of the base and the sine of one of the base angles, a source of electrical power for both of said circuit means, said circuit means including a pair of transformers having substantially identical electrical characteristics, the primary windings of said transformers being connected in parallel to said source and the secondary windings being connected one to each of said circuit means, and means connected between said circuits for selecting a portion of the first mentioned potential equal to the potential corresponding to the product, whereby said range is determined.

8. In an electrical range computing circuit operative by angular directional observations from points on a known linear base of a distant object whose range to one of said points is to be determined, circuit means for establishing an electrical potential corresponding to the angle subtended by two lines extending respectively between the target and each of the observation points, circuit means for establishing another electric potential corresponding to the product of the base and the sine of one of the base angles, a source of electrical power for both of said circuit means, said circuit means including a pair of transformers having substantially identical electrical characteristics, the primary windings of said transformers being connected to said source and the secondary windings being connected one to each of said circuit means, a capacitor connected in each of said circuit means to tune said circuit means to the source frequency, and means connected between said circuits for selecting a portion of the first mentioned potential equal to the potential corresponding to the product, whereby said range is determined.

9. In an electrical range computing circuit operative by angular directional observations from points on a known linear base of a distant object whose range to one of said points is to be determined, circuit means including a potentiometer having a movable arm for establishing with said arm an electrical potential corresponding to the angle subtended by two lines extending respectively between the target and each of the observation points, locked-in self-synchronous operator means having a part located at each point, and means connecting said arm to said operator means, said operator means thereby being effective for positioning said arm in accordance with the angular positions of said parts; a transformer having relatively rotatable primary and secondary windings, a source of power for said primary winding, and an operative connection for rotating one of said windings from one of said points for establishing an electrical potential corresponding to a function of the base angle at said point; a circuit connected to said secondary winding for establishing a potential corresponding to the product of the base and the sine of said base angle; a second transformer having similar electrical characteristics to the first mentioned transformer, connected at its primary winding to said source of power and at its secondary winding to said circuit means to furnish power thereto; and means connected between said circuit means and said circuit for selecting a portion of the first mentioned potential equal to the potential corresponding to the product, whereby said range is determined.

10. In a system for measuring the distance from one of two relatively fixed direction finding stations to an object by triangulation a synchro-generator located at the first of said stations and coupled for rotation to the direction finding means of said first station; a differential generator located at the second of said stations and coupled for rotation to the direction finding means of said second station; means for applying alternating current to said synchro-generator; a signal transmitting connection between said generators to provide an output voltage corresponding to the angle subtended at said object by two lines extending respectively between said object and each of said stations; a first control transformer connected for energization to the output of said differential generator; a servo-motor connected to the output of the first control transformer for energization therefrom and mechanically coupled thereto to rotate the rotor thereof in a direction tending to reduce the output voltage therefrom substantially to zero; a second control transformer energized from a source of alternating current coupled mechanically to the differential generator for simultaneous rotation therewith to provide an output voltage corresponding to the sine of the base angle at said second station; a circuit on which the latter voltage is impressed for providing a first measuring voltage corresponding to the product of the base and the sine of said base angle; means energized from one of said sources of alternating current and controlled by said servo-motor for providing a second measuring voltage in accordance with the first mentioned angle; and means connected between said last-mentioned means and said circuit for selecting a portion of said second measuring voltage equal to said first measuring voltage, whereby said distance is determined.

LAURENCE BATCHELDER.

REFERENCES CITED

The following references are of record in the file of this patent:

UNITED STATES PATENTS

| Number | Name | Date |
| --- | --- | --- |
| 1,612,117 | Hewlett et al. | Dec. 28, 1926 |
| 2,432,504 | Boghosian et al. | Dec. 16, 1947 |
| 2,439,381 | Darlington et al. | Apr. 13, 1948 |
| 2,439,891 | Hornfeck | Apr. 20, 1948 |
| 2,443,624 | Lovell et al. | June 22, 1948 |

FOREIGN PATENTS

| Number | Country | Date |
| --- | --- | --- |
| 598,068 | France | Sept. 16, 1925 |